United States Patent Office 3,473,412
Patented Oct. 21, 1969

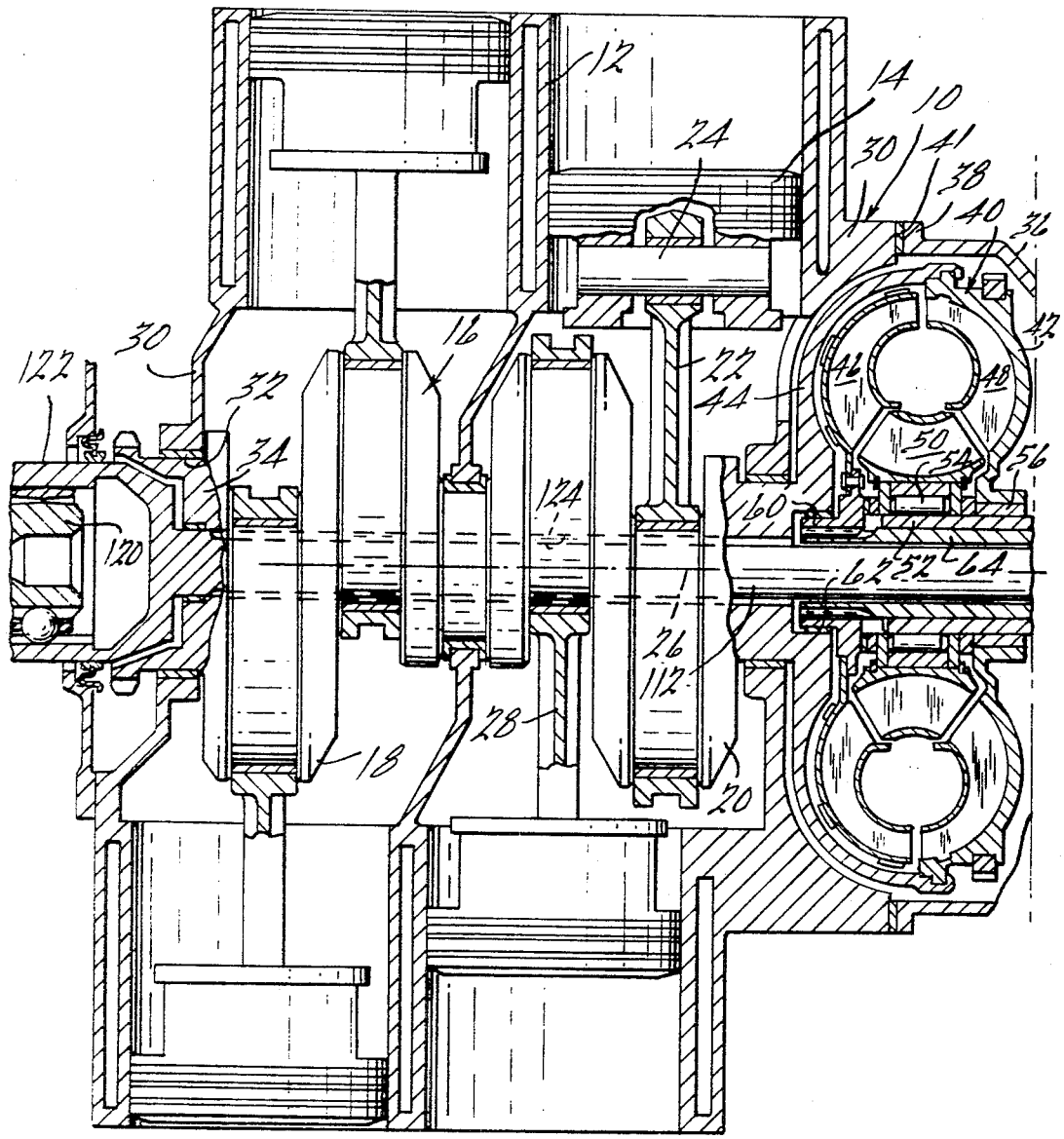

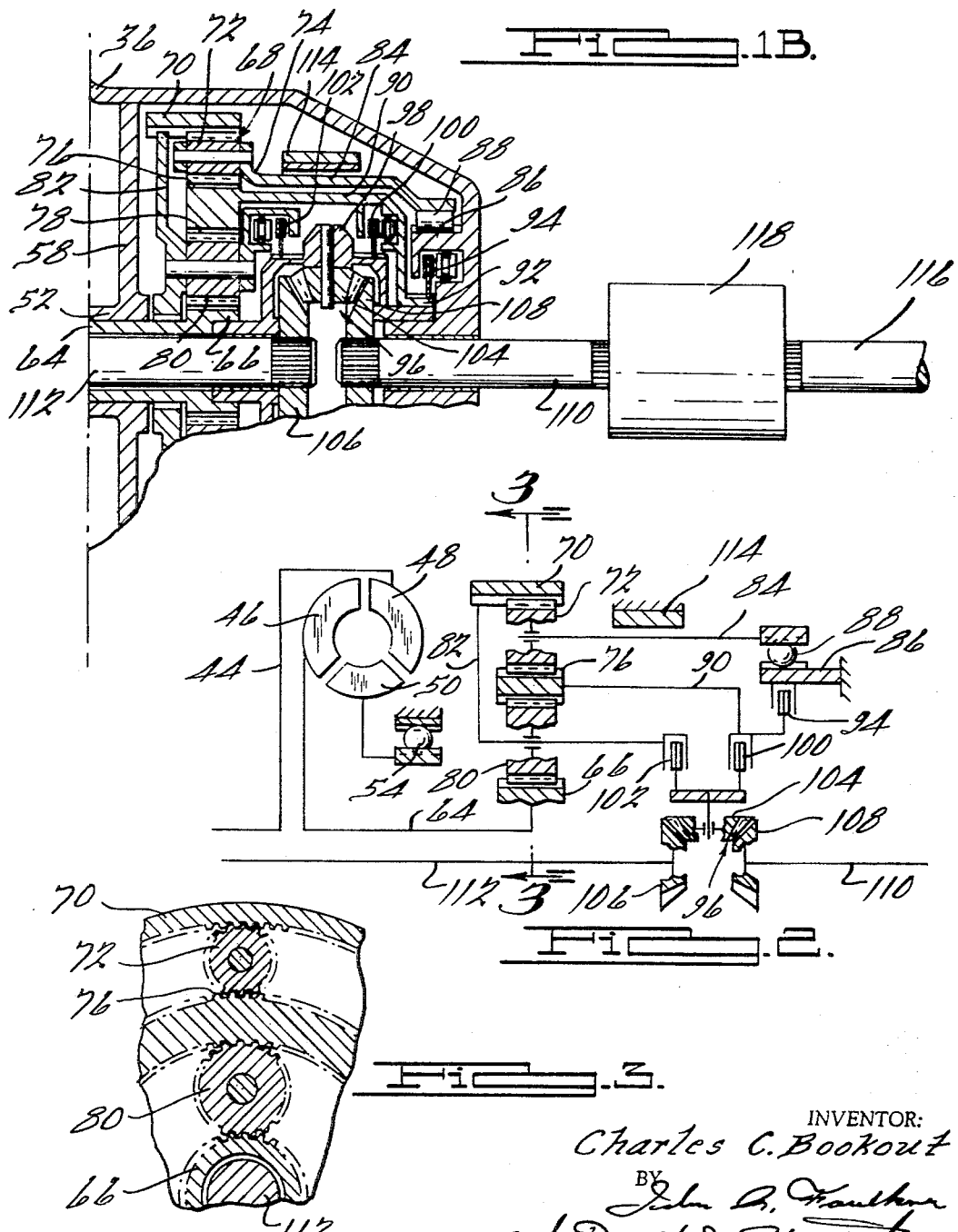

3,473,412
MULTIPLE RATIO AUTOMATIC TRANSMISSION AND AXLE ASSEMBLY
Charles C. Bookout, Orchard Lake, Mich., assignor to Ford Motor Company, Dearborn, Mich., a corporation of Delaware
Filed Mar. 14, 1968, Ser. No. 713,125
Int. Cl. F16h *37/08, 57/10*
U.S. Cl. 74—695                8 Claims

ABSTRACT OF THE DISCLOSURE

An internal combustion engine and transmission assembly for use in an automotive vehicle driveline having a crankshaft situated transversely with respect to the centerline of the vehicle so that it can be coupled at its ends to the vehicle traction wheels, the assembly being characterized by a hydrokinetic torque converter which forms a part of the crankshaft and a compact planetary gear arrangement within the transmission housing wherein the planetary gear elements are situated for rotation in a common transverse plane with the output shaft extending concentrically through the crankshaft.

GENERAL DESCRIPTION OF THE INVENTION

The invention comprises an automotive vehicle driveline having an internal combustion engine with the axis of the crankshaft arranged transversely with respect to the centerline of the vehicle. The engine is combined in a composite power plant assembly with a multiple ratio transmission having a hydrokinetic torque converter. The torque converter includes an impeller shell which forms a part of the engine crankshaft. The turbine of the torque converter is connected to the power input element of a gearing arrangement comprising two simple planetary gear units that produce two forward driving ratios and a single reverse ratio and wherein the gear units are arranged in radial disposition thereby reducing to a minimum the axial length of the transmission and engine assembly. The output of the gearing is distributed through a differential drive to a pair of axle shafts that are coaxial with the converter and the crankshaft. One axle shaft extends through a central opening formed in the crankshaft at one side of the vehicle.

Provision is made for simplifying ratio changes in the gear units to adapt the driveline for different operating requirements.

The compact arrangement of the converter, the gearing and the engine permits the use of this assembly in a front wheel drive vehicle with a minimum space penalty although it could be used also in a rear wheel drive with the engine mounted rearwardly rather than in a forward engine compartment. The minimum width that is possible for the driveline permits the use of universal joint couplings for establishing a driving connection between the transmission output shaft and the axle shafts without the necessity for an unusually high operating angle for the universal joints.

BRIEF DESCRIPTION OF THE FIGURES OF THE DRAWINGS

FIGURES 1A and 1B show a longitudinal, cross-sectional view of my improved engine and transmission assembly.

FIGURE 2 shows a schematic diagram of the torque transmitting elements of the construction of FIGURES 1A and 1B.

FIGURE 3 is a cross-sectional view taken along the plane of section line 3—3 of FIGURE 2.

PARTICULAR DESCRIPTION OF THE INVENTION

In FIGURE 1 the engine is designated generally by numeral 10. It includes internal combustion engine cylinders 12 within which are situated reciprocating pistons 14. The engine crankshaft is identified generally by reference character 16. It includes a first crankshaft throw portion 18 and a second crankshaft throw portion 20. Piston rod 22 is connected to the crankshaft throw portion 20 at its radially inward end and is connected to piston wrist pin 24 at its outer end. Wrist pin 24 in turn establishes an articulated driving connection between a piston 14 and the piston rod 22. As the crankshaft 16 rotates about its axis of rotation 26 the piston 14 is reciprocated within the cylinder 12.

A second piston rod is shown in part at 28. It is connected to crankshaft throw portion 20 in a manner similar to the connection with the piston rod 22. A pair of piston rods is connected also to the crankshaft throw portion 18. The total number of cylinders in the engine illustrated in FIGURE 1 is 4.

A portion of the engine housing is shown at 30. It is formed with a bearing opening 32 which receives one end 34 of the crankshaft 16.

The right-hand side of the engine housing 30 has secured thereto a transmission housing 36 which includes a peripheral portion 38 that is bolted or otherwise secured to a mounting flange 41 on the housing 30.

The housing 36 and the housing 30 enclose a hydrokinetic torque converter 40 which comprise an impeller shell 42. The shell 42 includes a semi-toroidal wall 44 which is connected to and which is formed integrally with the crankshaft 16. The shell part 42 cooperates with the shell part 44 to define a torus cavity that encloses a bladed turbine 46. This is situated in toroidal fluid flow relationship with respect to the impeller which is comprised of impeller blades 48.

A bladed stator 50 is situated between the flow exit section of the turbine and the flow entrance section of the impeller. It is mounted on a stationary stator sleeve shaft 52. An overrunning brake 54 situated in the hub of the stator 50 anchors the stator 50 against rotation in a direction opposite the direction of rotation of the impeller, but it permits freewheeling motion of the stator 50 on the shaft 52 in the opposite direction. The shell 42 is journalled by means of a bushing 56 on the stator sleeve shaft 52. Sleeve shaft 52 is supported by a transverse housing wall 58 connected at its periphery to the housing 36.

Turbine 46 has a hub 60 which is journalled within pilot opening 62 formed in the shell part 44. Hub 60 is connected by means of a splined connection to turbine sleeve shaft 64 to which is connected sun gear 66. The sun gear 66 forms a part of a compound planetary gear unit 68 which is enclosed within the housing 36. Gear unit 68 includes a ring gear 70 which meshes directly with planetary pinions 72 carried rotatably by carrier 74. Pinions 72 engage also a gear member which is formed with external sun gear teeth 76 and internal ring gear teeth 78. Teeth 78 engage planet pinions 80 rotatably supported on carrier 82. Pinions 80 engage drivably the sun gear 66.

Carrier 74 is connected to brake drum 84 which may be braked to a shoulder 86 formed on the housing 34 by means of an overrunning brake 88. Brake 88 will permit rotation of the drum 84 in one direction, but will prevent rotation in the other direction. The gear member on which the gear teeth 76 and gear teeth 78 is formed is connected to clutch drum 90 having a hub 92 which is journalled rotatably on the housing 34. A high speed ratio brake 94 is used to selectively anchor and release the clutch drum 90.

A differential gear unit is shown at 96. It includes a carrier 98 that may be clutched selectively to the clutch drum 90 by means of a pressure operated clutch 100 during reverse drive. During forward drive the carrier 98 may be clutched by means of slectively engageable clutch 102 to the carrier 82.

Differential pinions 104 are journalled rotatably within the carrier 98. They engage drivably differential side gears 106 and 108, the latter being connected to a first output shaft 110 and the former being connected to a second output shaft 112.

During reverse drive the drum 84 is braked by a selectively engagable brake band 114.

Shaft 110 is connected to a first axle shaft 116 by means of a universal joint shown schematically at 118. In a similar fashion shaft 112 may be connected to a second axle shaft 120 by means of the universal joint shown schematically at 122.

Shaft 112 extends through the turbine sleeve shaft 64 and through a central opening 124 formed in the crankshaft 16.

During forward drive operation two speed ratios are available, each ratio being an underdrive ratio. To establish the lowest forward driving speed ratio it is merely necessary to engage the forward drive clutch 102. Engine torque in the crankshaft is delivered to the impeller. The multiplied turbine torque is distributed to the sun gear 66 through the shaft 64. Rotation of the carrier 82 is resisted because of the load of the axles. The ring gear teeth 78 under these circumstances tend to be driven in a direction opposite to the direction of rotation of the sun gear 66. The motion of the ring gear teeth 78 is common to that of the gear teeth 76. Thus the ring gear 70 is driven in a direction opposite to the direction of rotation of the sun gear teeth 66. The carrier 74 acts as a reaction member since it is braked against rotation by the overruning brake 88. A split torque delivery path thus is established between turbine shaft 64 and the carrier 82.

The torque delivered to the carrier 82 is distributed to the differential carrier 98. The torque is divided by the differential pinions 104 and distributed to each of the side gears, which in turn distribute torque to the output shafts 110 and 126.

To establish the higher forward-driving speed ratio, it merely is necessary to engage the clutch 94. This anchors the drum 90 and the ring gear teeth 78. The torque distributed by the turbine to the sun gear 66 then is multiplied by the planetary gearing to produce an increased torque in the differential carrier 98. Clutch 102 remains applied to accommodate this torque. The overrunning brake 88 freewheels as the low to high speed ratio shift is accomplished.

Reverse drive is obtained by disengaging the forward drive clutch 102 and engaging the reverse drive clutch 100. At the same time brake band 114 is applied to prevent rotation of the carrier 74. Carrier 74 under these circumstances acts as a reaction member. Again a split torque delivery path is established as the ring gear teeth 78 are driven in a reverse direction. The corresponding motion of the gear teeth 76 tends to drive the ring gear 70 and the carrier 82 in the same direction as the direction of motion imparted to the carrier 82 by the sun gear 66. The combined torque on the sun gear teeth 76 then is distributed through the engaged reverse clutch 100 to the differential carrier and hence to the output shafts 110 and 112.

I have provided a compact assembly of an internal combustion engine and a hydrokinetic, multiple-ratio, torque converter transmission mechanism having reduced axial dimensions. It is adapted readily to be used in a cross-axis drive arrangement in an automotive vehicle driveline. I have achieved this simplicity without impairing the torque ratio range that is available and without impairing the performance characteristics of the driveline. The normal differential action required in installations of this type have been accomplished in my improved driveline arrangement by differential gearing that forms a part of the torque ratio gearing and that is located within a common housing with the elements of the torque delivery path.

What I claim and desire to secure by U.S. Letters Patent is:

1. An assembly comprising an internal combustion engine having a crankshaft, a hydrokinetic torque converter comprising an impeller, a turbine and a stator situated in toroidal fluid flow relationship, said crankshaft being connected to said impeller to form a unitary rotary assembly, a planetary gear system including two simple planetary gear units, each gear unit having a sun gear, a ring gear, planet pinions engageable with said sun and ring gears and a carrier journalling said planet pinions, the sun gear of the first of said units being connected to said turbine, the ring gear of said first gear unit and the sun gear of said second gear unit being connected together, the sun gear of said second gear unit being spaced radially outwardly with respect to the ring gear of said first gear unit, the carrier of said first gear unit being connected to the ring gear of said second gear unit, a driven shaft extending concentrically with respect to said torque converter, said driven shaft being rotatably journalled concentrically within said crank shaft, means for connecting said driven shaft selectively to the carrier of said first gear unit for forward drive operation and to the sun gear of said second gear unit for reverse drive operation, brake means for anchoring the carrier of said second gear unit during low speed ratio forward-drive operation thereby establishing a split torque delivery path through said gear system from said turbine to said driven shaft, and brake means for anchoring the sun gear of said second gear unit to provide torque reaction during second speed ratio forward-drive operation.

2. The combination as set forth in claim 1 wherein said connecting means includes differential gear means comprises a pair of differential side gears, one side gear being connected to said driven shaft, differential pinions engaging said side gears, a carrier for journalling rotatably said differential pinions, said connecting means further comprising a forward drive clutch adapted to connect drivably said differential carrier and the carrier of said first gear unit and a reverse drive clutch adapted to connect said differential carrier to the sun gear of said second gear unit.

3. The combination as set forth in claim 2 wherein the brake means for anchoring the carrier for said second gear unit comprises an overrunning brake adapted to deliver torque reaction to a stationary portion of said mechanism during torque delivery through said gear system in the low-speed forward-drive ratio and a friction brake adapted to anchor the carrier for said second gear unit to complement the action of said overrunning brake, said friction brake being engaged during reverse drive operation.

4. The combination as set forth in claim 3 wherein said friction brake means for anchoring the sun gear for said second gear unit is adapted to provide a torque reaction point during forward-drive operation in the high speed ratio.

5. The combination as set forth in claim 1 wherein said torque converter and said gear system are enclosed by a transmission housing, said turbine being connected to the sun gear of said first gear unit through a turbine sleeve shaft, said sleeve shaft extending concentrically through said torque converter, said driven shaft being journalled rotatably within said sleeve shaft and extending through said crankshaft.

6. The combination as set forth in claim 2 wherein said torque converter and said gear system are enclosed by a transmission housing, said turbine being connected to the sun gear of said first gear unit through a turbine sleeve shaft, said sleeve shaft extending concentrically through said converter, said driven shaft being journalled rotatably within said sleeve shaft and extending through said crankshaft.

7. The combination as set forth in claim 3 wherein said torque converter and said gear system are enclosed by a transmission housing, said turbine being connected to the sun gear of said first gear unit through a turbine sleeve shaft, said sleeve shaft extending concentrically through said converter, said driven shaft being journalled rotatably within said sleeve shaft and extending through said crankshaft.

8. The combination as set forth in claim 4 wherein said torque converter and said gear system are enclosed by a transmission housing, said turbine being connected to the sun gear of said first gear unit through a turbine sleeve shaft, said sleeve shaft extending concentrically through said converter, said driven shaft being journalled rotatably within said sleeve shaft and extending through said crankshaft.

References Cited

UNITED STATES PATENTS

| | | | |
|---|---|---|---|
| 487,615 | 12/1892 | Frazeur | 74—753 |
| 1,619,051 | 3/1927 | Asprooth et al. | 74—695 |
| 1,808,109 | 6/1931 | Heinze | 74—700 XR |
| 1,880,270 | 10/1932 | Noble | 74—700 XR |
| 2,478,868 | 8/1949 | Hasbany | 74—763 |
| 2,806,388 | 9/1957 | Simpson | 74—759 |

FOREIGN PATENTS

| | | |
|---|---|---|
| 7,038 | 3/1910 | Great Britain. |
| 804,047 | 7/1936 | France. |

DONLEY J. STOCKING, Primary Examiner

T. C. PERRY, Assistant Examiner

U.S. Cl. X.R.

74—759; 180—42